(12) United States Patent
McKeen et al.

(10) Patent No.: US 8,685,493 B2
(45) Date of Patent: *Apr. 1, 2014

(54) PROCESS FOR FORMING A NON-STICK SURFACE ON THE INTERIOR SURFACE OF A PIPE

(75) Inventors: Laurence Waino McKeen, Sewell, NJ (US); Kimberly Dawn Farnsworth, Walker, WV (US); W. Douglas Obal, Vail, AZ (US); Pidatala K. Mohan, West Windsor, NJ (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/486,583

(22) Filed: Jun. 1, 2012

(65) Prior Publication Data

US 2012/0241086 A1 Sep. 27, 2012

Related U.S. Application Data

(62) Division of application No. 12/606,360, filed on Oct. 27, 2009, now Pat. No. 8,211,497, which is a division of application No. 11/098,980, filed on Apr. 5, 2005, now abandoned.

(51) Int. Cl.
*B05D 7/22* (2006.01)
*B05D 3/02* (2006.01)
*B05D 3/12* (2006.01)

(52) U.S. Cl.
CPC ... *B05D 7/22* (2013.01); *B05D 3/02* (2013.01); *B05D 3/12* (2013.01)
USPC .......................... 427/230; 427/239; 427/375

(58) Field of Classification Search
CPC ............... B05D 7/22; B05D 3/02; B05D 3/12
USPC .................. 427/230–239, 375; 118/DIG. 10, 118/DIG. 13; 138/140, 145, 146
See application file for complete search history.

(56) References Cited

U.S. PATENT DOCUMENTS

| | | | |
|---|---|---|---|
| 2,685,707 A | 8/1954 | Llewellyn et al. | |
| 2,833,686 A | 5/1958 | Sandt | |
| 2,833,866 A | 5/1958 | Esser | |
| 3,087,827 A | 4/1963 | Klenke, Jr. et al. | |
| 3,087,828 A | 4/1963 | Linton | |
| 3,087,829 A | 4/1963 | Linton | |
| 3,356,108 A | 12/1967 | Johnston | |
| 3,462,825 A * | 8/1969 | Pope et al. | 29/451 |
| 3,749,621 A | 7/1973 | Shoffner | |
| 3,920,793 A | 11/1975 | Teti et al. | |
| 3,959,424 A * | 5/1976 | Dawson et al. | 264/516 |
| 4,031,286 A | 6/1977 | Seymus | |
| 4,380,618 A | 4/1983 | Khan et al. | |
| 4,743,658 A | 5/1988 | Imbalzano et al. | |
| 5,000,369 A * | 3/1991 | Shotts et al. | 228/147 |
| 5,072,248 A | 12/1991 | Kakiuchi | |
| 5,198,053 A | 3/1993 | Duncan | |
| 5,356,665 A | 10/1994 | Seki et al. | |
| 5,454,419 A | 10/1995 | Vloedman | |
| 5,566,984 A | 10/1996 | Abbema et al. | |
| 5,626,907 A | 5/1997 | Hagiwara et al. | |
| 5,653,266 A | 8/1997 | Reynolds et al. | |
| 5,670,010 A | 9/1997 | Hagiwara et al. | |
| 5,726,247 A | 3/1998 | Michalczyk et al. | |
| 5,867,883 A | 2/1999 | Iorio et al. | |
| 5,941,286 A | 8/1999 | Fauble et al. | |
| 5,972,494 A * | 10/1999 | Janssens | 428/324 |
| RE36,362 E | 11/1999 | Jackson | |
| 6,041,827 A | 3/2000 | Takahashi et al. | |
| 6,232,372 B1 | 5/2001 | Brothers et al. | |
| 6,397,895 B1 | 6/2002 | Lively | |
| 6,505,649 B1 | 1/2003 | Dixon-Roche | |
| 6,518,349 B1 | 2/2003 | Felix et al. | |
| 6,539,981 B1 | 4/2003 | Kleven et al. | |
| 6,612,343 B2 | 9/2003 | Camberlin et al. | |
| 6,632,902 B2 | 10/2003 | Lahijani | |
| 6,680,093 B1 | 1/2004 | Ries et al. | |
| 6,863,974 B2 | 3/2005 | Shah et al. | |
| 7,347,258 B2 | 3/2008 | McKeen | |
| 7,399,533 B2 | 7/2008 | Zheng et al. | |
| RE40,516 E | 9/2008 | Parsonage et al. | |
| 7,575,789 B2 | 8/2009 | McKeen | |
| 7,588,058 B2 | 9/2009 | McKeen et al. | |
| 7,870,877 B2 | 1/2011 | McKeen et al. | |
| 7,871,684 B2 | 1/2011 | McKeen | |
| 8,211,497 B2 * | 7/2012 | McKeen et al. | 427/230 |
| 2002/0185188 A1 | 12/2002 | Quigley et al. | |
| 2003/0087053 A1 | 5/2003 | Fukushi | |
| 2005/0074570 A1 | 4/2005 | Agrawal | |
| 2005/0155662 A1 | 7/2005 | Nie | |

(Continued)

FOREIGN PATENT DOCUMENTS

| | | |
|---|---|---|
| CA | 1241262 | 8/1988 |
| EP | 0190092 | 3/1989 |
| EP | 0226668 B1 | 1/1992 |
| JP | 1975048038 A | 4/1975 |
| JP | 550733741 | 6/1980 |
| JP | 1980073374 A1 | 6/1980 |
| JP | 11227046 | 8/1999 |
| JP | 2001121606 A | 5/2001 |
| WO | 9712209 A1 | 4/1997 |

OTHER PUBLICATIONS

Husky Oil, Inter-Office Memorandum, RE Coating Evaluation Test Tool Results, Sep. 20, 1993.

*Primary Examiner* — William Phillip Fletcher, III

(57) ABSTRACT

The present invention relates to a vessel, in particular a pipe, especially an oil pipe, having a preformed film adhered onto the interior surface of the pipe, the interior surface of the preformed film reducing the deposition of at least one of asphaltenes, paraffin wax, and inorganic scale by at least 40% as compared to the interior surface of said oil pipe without said preformed film being present. In a preferred embodiment, the preformed film is adhered to the interior surface of the pipe with a primer layer with an optional barrier layer between the primer layer and the preformed film.

5 Claims, No Drawings

(56) References Cited

U.S. PATENT DOCUMENTS

2006/0137757 A1 6/2006 McKeen et al.
2006/0275572 A1 12/2006 Bonnet et al.
2009/0078328 A1 3/2009 Albert et al.

\* cited by examiner

PROCESS FOR FORMING A NON-STICK SURFACE ON THE INTERIOR SURFACE OF A PIPE

This application is a Division of U.S. patent application Ser. No. 12/606,360, filed Oct. 27, 2009, now U.S. Pat. No. 8,211,497, which in turn is a Division of U.S. patent application Ser. No. 11/098,980, filed May 5, 2005, now abandoned.

FIELD OF THE INVENTION

This invention relates to vessels or pipes that store or convey chemicals and more particularly to linings for the interior surface of such vessels. In particular, the vessel may be a storage tank or an oil conveying pipe.

BACKGROUND OF THE INVENTION

Pipes used in the production and transportation of chemicals are subject to corrosion and plugging. An example of such a pipe is oil pipe which is generally large and for reasons of economy is manufactured from carbon steel rather than more expensive corrosion resistant alloys. Corrosion is induced by the hot underground environment in which downhole pipes convey oil from deeply buried deposits to the earth's surface. Materials such as water, sulfur, sulfur dioxide, carbon dioxide, present in the oil typically make it acidic causing corrosion of the interior surface of the pipe. Even at cooler temperatures, transportation pipelines that extend for long distances close to the earth's surface experience the effects of corrosion because of the long contact times involved. Corroded pipes are difficult and expensive to replace.

Plugging occurs when organic materials soluble in the oil at high temperatures of the oil deposit become insoluble as the oil cools during the rise through a pipe to the earth's surface. The resultant insoluble materials, such as asphaltenes and paraffin waxes, tend to plate out on the interior surface of the pipe, restricting the oil flow and eventually plugging the pipe. An additional problem arises from soluble inorganic material, commonly referred to as scale and generally comprising calcite and/or barite, present in the oil or in the salt water associated with the conveying of oil from underground deposits. Plugging also occurs during long distance conveying of the oil through pipelines. Plugging requires that production or transportation cease while the pipe is cleaned out either by mechanical scraping (pigging), chemical treatment or hot oiling. Such cleaning reduces productivity and involves large maintenance costs.

Similar problems occur for oil storage vessels and pipes and storage vessels used in the manufacture and transportation of corrosive chemicals in the Chemical Processing Industry (CPI). There remains a need for solving the problems of corrosion and plugging that occurs in pipes conveying chemicals, especially oil pipes whether used in oil wells or for oil conveying. What would be desirable is a pipe or vessel with an interior surface which resists the deposit of insoluble organic materials and inorganic materials and has resistance to the corrosive effects of acids. Further there is a desire that the interior surface be durable lasting for many years in harsh environments.

BRIEF SUMMARY OF THE INVENTION

The present invention satisfies the need by providing a pipe for conveying chemicals, especially an oil conveying pipe (oil pipe) having a nonstick interior surface formed by a preformed fluoropolymer film adhered to its interior surface. The preformed film is capable of reducing-to-eliminating the deposition (buildup) of one or more of the asphaltene, paraffin wax, and inorganic scale on the interior surface of the oil pipe. Preferably, this reduction is at least 40%, preferably at least 50%, for at least one of these materials as compared to the unlined oil pipe, and more preferably at least 40% for all of them. These percent reductions can be determined by periodic measurements of the amount of build-up within the pipe or simply by observing the more than double the production time before the oil well must be shut down for cleaning. These deposition reductions are accompanied by the added benefit of corrosion protection as compared to unlined oil pipe. The reduced deposition performance of the lined pipes of the present invention is in contrast to the result obtained for epoxy resin-lined oil pipe, wherein the deposition is greater than for the unlined pipe.

In a preferred embodiment, a primer layer, preferably of fluoropolymer, is the mechanism for adhering the preformed film to the interior surface of the vessel or pipe. In this embodiment, the preformed film is adhered to the primer layer. The fluoropolymer in the primer layer and the preformed film are preferably independently selected from the group of polymers and copolymers of trifluoroethylene, hexafluoropropylene, monochlorotrifluoroethylene, dichlorodifluoroethylene, tetrafluoroethylene, perfluorobutyl ethylene, perfluoro(alkyl vinyl ether), vinylidene fluoride, and vinyl fluoride and blends thereof and blends of said polymers with a nonfluoropolymer. In one embodiment, the primer layer contains at least one heat resistant polymer binder. In a preferred embodiment, the interior surface of the oil pipe has a fluoropolymer barrier layer positioned between the primer layer and the preformed film.

The invention further provides for forming a nonstick surface on the interior surface of a pipe for conveying chemicals, especially an oil pipe, using the following steps: applying a fluoropolymer primer coating to the interior surface, heating the coating to form a primer layer on the surface applying a preformed fluoropolymer film on the primer layer, and fusion bonding the preformed fluoropolymer film to the primer by baking the pipe. The lined pipe formed by this process has a nonstick surface which withstands continuous service at a temperature of at least 250° F. (121° C.). The preformed film is preferably in the shape of tubular liner. In a preferred embodiment, the tubular liner is applied to the interior surface of the pipe by gripping one end of the liner, pulling the liner into the pipe, mechanically reducing the liner, releasing the liner and allowing the liner to expand into tight engagement with said interior surface of the pipe.

The use of preformed film enables thick lining of uniform thickness to be formed. It is unexpected that this thick film can be adhered to the interior of the pipe by the primer layer as will be explained hereafter.

DETAILED DESCRIPTION OF THE INVENTION

The present invention is directed to a vessel for conveying or storing oil or chemicals. In particular, the vessel may be a storage tank or an oil conveying pipe. The storage vessel invention is exemplified as oil conveying pipe (oil pipe) which may be used as a succession of such pipes in an oil transportation pipeline or a down-hole oil well pipeline, it being understood, however, that the vessel of the present invention is not so limited. Such oil pipes are generally large having an inner diameter of at least 2 in (5 cm) and sometimes as large as 6 in (15.24 cm) and length of at least 10 ft (3 m), more often at least 20 ft (6.1 m) and often a length of at least 30 ft (9.1 m). While the relative dimensions of the oil pipe are large, the thickness of the lining is quite small. The primer layer needs only to be thin enough to adhere the overcoat layer to itself and thereby to the interior surface of the oil pipe.

The pipes are typically made from rigid metal although they could be made of flexible metal tubing. For reasons of economy they are usually made of carbon steel and as such are prone to corrosive attack from acidic entities in the oil unless protected by a corrosion resistant coating. In this invention, a surface which is both corrosion resistant and which possesses good release characteristics is applied to the interior surface of the pipe. Beneficial effects are also seen for pipes that are made from other substrates such as aluminum, stainless steel and other corrosion resistant alloys.

Therefore, in accordance with the present invention, there is provided a pipe, and preferably, an oil pipe, which has preformed fluoropolymer film adhered to the interior surface of the vessel. In a preferred embodiment, a primer layer, preferably of fluoropolymer is adhered to the interior surface of the pipe. The primer layer of the oil pipe preferably has a thickness of in the range of 5-100 micrometers, preferably 10-30 micrometers, sufficient to adhere the preformed film to the primer. In an especially preferred embodiment, the preformed film typically has a thickness from about 20 mils to about 250 mils (500-6250 micrometers), preferably from about 20 mils to about 100 mil (500-2500 micrometers). Such thick films are of particular benefit in these highly abrasive and severely corrosive environments. The preformed film is impermeable to the corrosive materials present in the oil and presents a nonstick surface to the oil, whereby the insoluble organic materials present in the oil do not stick to the overcoat, and restriction of oil flow and plugging is avoided. Further the thick film is able to provide insulation to the oil pipe to mitigate the change from hot underground conditions to cooler earth surface effects, thereby resisting the deposit of the insoluble organic and inorganic materials. In addition, thick films possess increased abrasion resistance to sand and rock contained in the oil and to effects of tools scraping on the interior surface of pipe as these instruments are being lowered into the well for various measuring or servicing operations. Thick films of this invention resist both penetration and wear.

The preformed film does not adhere to the interior surface of the pipe. The intervening primer layer provides adhesion both to the preformed film and to the interior surface of the pipe. The primer layer by itself does not provide sufficient nonstick character and impermeability to the corrosive materials present in the oil to protect the interior surface of the pipe from corrosion. The use of both a primer and a preformed film lining has the benefit of providing good adhesion to the interior metal surface yet allowing for the desirable thickness a preformed film can provide.

In an especially preferred embodiment, the interior surface of the oil pipe has a fluoropolymer barrier layer positioned between the primer layer and the preformed film. The barrier layer has a typical thickness of about 1 to about 10 mils (25-254 micrometers). Preferably the barrier layer comprises a fluoropolymer and a platelet shaped filler particle that are relatively inert to chemical attack. The particles form a mechanical barrier against permeation of water, solvent and oxygen to the substrate and are present in the amount of about 2 to about 10% by weight based on the total dry weight of the barrier layer. In spray application, the particles tend to align parallel to the interior surface of the pipe. Since oxygen, solvent and water cannot pass through the particles themselves, the presence of aligned particle particles further reduces the rate permeation through the polymer film which is formed. Examples of typical platelet shaped filler particles include mica, glass flake and stainless steel flake. It is also within the scope of this invention that the preformed film may contain platelet shaped filler particles with or without the presence of an intermediate barrier layer. In this embodiment, the particles are present in the preformed film layer in the amount of from 2 to about 10% by weight based on the weight of the preformed film. Such particles tend to align in the manufacture of a preformed film during conventional extrusion processes and contribute to the permeation resistance of the film structure formed on the interior surface of a pipe.

The platelet shaped particles of filler component of the barrier layer are preferably mica particles, including mica particles coated with an oxide layer like iron or titanium oxide. These particles have an average particle size of about 10 to 200 microns, preferably 20-100 microns, with no more than 50% of the particles of flake having average particle size of more than about 300 microns. The mica particles coated with oxide layer are those described in U.S. Pat. Nos. 3,087,827 (Klenke and Stratton); 3,087,828 (Linton); and 3,087,829 (Linton).

The micas described in these patents are coated with oxides or hydrous oxides of titanium, zirconium, aluminum, zinc, antimony, tin, iron, copper, nickel, cobalt, chromium, or vanadium. Mixtures of coated micas can also be used.

Fluoropolymers

The fluoropolymer in the primer layer, barrier layer and preformed film is independently selected from the group of polymers and copolymers of trifluoroethylene, hexafluoropropylene, monochlorotrifluoroethylene, dichlorodifluoroethylene, tetrafluoroethylene, perfluorobutyl ethylene, perfluoro(alkyl vinyl ether), vinylidene fluoride, and vinyl fluoride and blends thereof and blends of said polymers with a non-fluoropolymer. The fluoropolymers used in this invention are preferably melt-processable. By melt-processable it is meant that the polymer can be processed in the molten state (i.e., fabricated from the melt into shaped articles such as films, fibers, and tubes etc. that exhibit sufficient strength and toughness to be useful their intended purpose). Examples of such melt-processable fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Such fluoropolymers include polychlorotrifluoroethylene, copolymers of tetrafluoroethylene (TFE) or chlorotrifluoroethylene (CTFE). Preferred comonomers of TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The melt-processable copolymer is made by incorporating an amount of comonomer into the copolymer in order to provide a copolymer which typically has a melt flow rate of about 1-100 g/10 min as measured according to ASTM D-1238 at the temperature which is standard for the specific copolymer. Typically, the melt viscosity will range from $10^2$ Pa·s to about $10^6$ Pa·s, preferably $10^3$ to about $10^5$ Pa·s measured at 372° C. by the method of ASTM D-1238 modified as described in U.S. Pat. No. 4,380,618. Additional melt-processable fluoropolymers are the copolymers of ethylene or propylene with TFE or CTFE, notably ETFE, ECTFE, PCTFE, TFE/ETFE/HFP (also known as THV) and TFE/E/HFP (also known as EFEP). Further useful polymers are film forming polymers of polyvinylidene fluoride (PVDF) and copolymers of vinylidene fluoride as well as polyvinyl fluoride (PVF) and copolymers of vinyl fluoride.

While the fluoropolymer component is preferably melt-processible, polytetrafluoroethylene (PTFE) including modified PTFE which is not melt-processible may be used together with melt-processible fluoropolymer or in place of such fluoropolymer. By modified PTFE is meant PTFE containing a small amount of comonomer modifier which improves film forming capability during baking (fusing), such as perfluoroolefin, notably hexafluoropropylene (HFP) or perfluoro (alkyl vinyl)ether (PAVE), where the alkyl group contains 1 to 5 carbon atoms, with perfluoro(ethyl vinyl) ether (PEVE) and perfluoro(propyl vinyl)ether (PPVE) being preferred. The amount of such modifier will be insufficient to confer melt fabricability to the PTFE, generally no more than 0.5 mole %. The PTFE, also for simplicity, can have a single melt viscosity, usually at least $1 \times 10^9$ Pa·s, but a mixture of PTFE's having different melt viscosities can be used to form the fluoropolymer component. Such high melt viscosity indicates that the PTFE does not flow in the molten state and therefore is not melt-processible.

The fluoropolymers in the primer layer, preformed film and barrier layer can be the same or different, provided that when baked together, they adhere to one another.

The fluoropolymer in the primer layer and barrier layer used in this invention is preferably independently selected rom melt processible fluorinated ethylene/propylene copolymer, ethylene/tetrafluoroethylene copolymer, and tetrafluoroethylene/perfluoro(alkyl vinyl ether) copolymer.

The fluoropolymer in the preformed film of this invention is preferably selected from polyvinyl fluoride (PVF), fluorinated ethylene/propylene copolymer, ethylene/tetrafluoroethylene copolymer, tetrafluoroethylene/perfluoro(alkyl vinyl ether) copolymer, polyvinylidene fluoride and a blend of polyvinylidene fluoride and an acrylic polymer, preferably nonfluoropolymer acrylic polymer.

A preferred ingredient in the primer is a heat resistant polymer binder, the presence of which enables the primer layer to adhere to the interior surface of the pipe. The binder component is composed of polymer which is film-forming upon heating to fusion and is also thermally stable. This component is well known in primer applications for nonstick finishes, for adhering the fluoropolymer-containing primer layer to substrates and for film-forming within and as part of a primer layer. The fluoropolymer by itself has little to no adhesion to the interior surface of the metal pipe. The binder is generally non-fluorine containing and yet adheres to the fluoropolymer.

Examples of the non-fluorinated thermally stable polymer binders include polyamideimide (PAI), polyimide (PI), polyphenylene sulfide (PPS), polyether sulfone (PES), polyarylene-etherketone, polyetherimide, and poly(1,4(2,6-dimethylephenyl)oxide) commonly known as polyphenylene oxide (PPO). These polymers are also fluorine-free and are thermoplastic. All of these resins are thermally stable at a temperature of at least 140° C. Polyethersulfone is an amorphous polymer having a sustained use temperature (thermal stability) of up to 190° C. and glass transition temperature of 220° C. Polyamideimide is thermally stable at temperatures of at least 250° C. and melts at temperatures of at least 290° C. Polyphenylene sulfide melts at 285° C. Polyaryleneetherketones are thermally stable at least 250° C. and melt at temperatures of at least 300° C. When the primer composition is applied as a liquid medium, the adhesion properties described above will manifest themselves upon drying and baking of the primer layer together with baking of the next applied layer of fluoropolymer to form the nonstick coating of the substrate.

The polymer binder can be applied as an undercoat to the pipe interior surface after treatment to remove contaminants and a solvent solution thereof, prior to application of the primer. The resultant dried thin film of polymer binder can further enhance the adhesion of the primer layer to the pipe interior surface.

For simplicity, only one binder resin may be used to form the binder component of the primer composition of the present invention. However, multiple binder resins are also contemplated for use in this invention, especially when certain end-use properties are desired, such as flexibility, hardness, or corrosion protection. Common combinations include PAI/PES, PAI/PPS and PES/PPS.

Other ingredients can be present in the primer, such as pigments, fillers, high boiling liquids, dispersing aids, and surface tension modifiers.

The primer layer is preferably liquid-based. The liquid basis of the primer coating is preferably an organic solvent. Although water-based primers may be used in some applications, the use of solvent deters the creation of rust on the interior surface of the pipe which may interfere with adhesion of the primer layer to the surface of the pipe.

The preferred liquid which enables the primer to be a liquid composition is one or more organic solvents, within which the fluoropolymer, present as particles, are dispersed and the polymer binder present either as dispersed particles or in solution in the solvent. The characteristics of the organic liquid will depend upon the identity of the polymer binder and whether a solution or dispersion thereof is desired. Examples of such liquids include N-methylpyrrolidone, butyrolactone, methyl isobutyl ketone, high boiling aromatic solvents, alcohols, mixtures thereof, among others. The amount of the organic liquid will depend on the flow characteristics desired for the particular coating operation.

The solvent should have a boiling point of 50 to 200° C., so as not to be too volatile at room temperature, but to be vaporized at reasonable elevated temperatures, less than the baking temperature of the fluoropolymer. The thickness of the primer layer coating is established by experience with the particular primer composition selected, including its fluoropolymer and polymer binder concentrations and the relative amount of solvent that is present. The primer layer of the oil pipe preferably has a thickness of in the range of 5-100 micrometers, preferably 10-30 micrometers. Preferably the primer contains 40 to 75 wt % solvent based on the combined weight of solvent, fluoropolymer and polymer binder.

Powder coatings may also be used for the primer layer. Examples of suitable powder coating compositions comprising perfluoropolymer and polymer binder, wherein these components are associated with one another in multicomponent particles are disclosed in U.S. Pat. Nos. 6,232,372 and 6,518,349. When the primer is applied as a dry powder, the adhesion property becomes manifest when the primer layer is baked.

The preformed fluoropolymer film can be made from melt processible polymers by well-known melt extrusion processes forming, as examples, preferred films of ETFE, FEP and PFA. Further the fluoropolymer film can be formed from fluid compositions that are either solutions or dispersions of fluoropolymer by casting or by plasticized melt extrusion processes. Examples include blends of polyvinylidene fluoride, or copolymers and terpolymers thereof, and acrylic resin as the principal components. PVF is a semicrystalline polymer that can be formed into a film by plasticized melt extrusion. Despite the fact that there are no commercial solvents for PVF at temperatures below 100° C., latent solvents such as propylene carbonate, N-methylpyrrolidone, γ-butyrolactone, sulfolane, and dimethyl acetamide are used to solvate the polymer at elevated temperatures causing the particles to coalesce and permit extrusion of a film containing latent solvent that can be removed by drying.

The preformed fluoropolymer film can also be made from non-melt processible films, for example by paste extrusion as described in U.S. Pat. No. 2,685,707. In paste extrusion, a paste extrusion composition is formed by mixing PTFE fine powder with an organic lubricant which has a viscosity of at least 0.45 centipoise at 25° C. and is liquid under the conditions of subsequent extrusion. The PTFE soaks up the lubricant, resulting in a dry, pressure coalescing paste extrusion composition that is also referred to as lubricated PTFE fine powder. During paste extrusion which is typically performed at a temperature of 20 to 60° C., the lubricated fine powder is forced through a die to form a lubricated green extrudate. The lubricated green extrudate is then heated, usually at a temperature of 100 to 250° C., to make volatile and drive off the lubricant from the extrudate. In most cases, the dried extrudate is heated to a temperature close to or above the melting point of the PTFE, typically between 327° C. and 500° C., to sinter the PTFE.

Alternatively, granular PTFE can be isotactically molded or ram extruded into a tubular liner and fitted into a pipe housing. In this embodiment, the liner is processed to a size somewhat larger than the inner diameter (I.D.) of the steel housing into which it is being installed. The liner is preferably pulled through a reduction die into a pipe that has been primed. A programmed heating cycle relaxes the liner inside the steel housing, resulting in a snug liner fit.

Pipes of the present invention are able to withstand the harsh conditions of oil production. These pipes are able to withstand typical reservoir conditions that are at least about 250° F. (121° C.) and 7,500 psi (52 MPa), with 275° F. (135° C.) and 10,000 psi (69 MPa) being quite common. The pipes of the present invention are also able to withstand conditions as high as 350° F. (177° C.) and 20,000 psi (138 MPa) present in some high temperature/high pressure reserves. The invention is also applicable to pipe used in the Chemical Processing Industry (CPI), especially in those applications where temperatures such as those described above are encountered. In the CPI temperatures of at least about 350° F. (177° C.) and even as high as 400° F. (204° C.) are used. The pipes of the preferred embodiment of this invention show superior permeation resistance to corrosive chemicals due to both to their construction, i.e., primer and thick preformed film with an optional intervening barrier layer, and their strong adherence to the interior surface of the pipe with the aid of a primer. In prior art systems where only a film liner is present, gas is able to permeate through the film to both corrode the pipe and to exert pressure on the film from the metal interface side of the film. This results in blistering at the metal interface and eventual buckling of the film to constrict and possibly block the interior of the pipe. Pipes of the present invention are able to deter the permeation of gases and vapors and resist the accumulation of chemicals at the interface of the metal and primer/film greatly retarding catastrophic failure. The lined pipes of the present invention are able to withstand the above described conditions for continuous service, e.g., for at least 30 days, preferably at least 60 days, and more preferably at least 12 months.

The vastness of the interior surface of this pipe over which the fluoropolymer lining is unsupported except by adhesion to the interior surface of the pipe requires high integrity for the adhesion bond, otherwise the varying conditions of temperature, pressure and even mechanical contacts can cause the lining to separate from the interior surface, leading to loss in corrosion and possibly even non-stick protection if the lining ruptures. Further, separation of the lining may result in collapse of the lining causing reduced flow or even plugging.

Moreover, in addition to the above-noted advantages, the present invention is capable of reducing the deposition of at least one of asphaltenes, paraffin wax and inorganic scale by at least 40% as compared to the interior surface of said oil pipe without said preformed film being present. In addition, the preformed film provides corrosion protection to the interior surface of the pipe.

Process

The invention further provides for forming a nonstick surface on the interior surface of a pipe using the following steps: applying fluoropolymer primer coating to the interior surface, heating the coating to form a primer layer on the surface, applying a preformed fluoropolymer film on the primer layer, and fusion bonding the preformed fluoropolymer film to the primer by baking the pipe. As a result thereof, a pipe is obtained in which the nonstick surface withstands continuous service at a temperature of at least about 250° F. (121° C.) as explained above. In a preferred embodiment the pipe is an oil conveying pipe. The heating is optionally sufficient to bake the primer layer. A wide variety of metal substrates such as aluminum, stainless steel, and especially metals that are not corrosion resistant, such as carbon steel, are suitable for the pipe of the present invention.

Optionally, contaminants may be removed from the interior surface of the pipe before the primer layer is formed thereon. The removing step is aimed at providing a clean adherent surface for the preformed film to be adhered to the interior surface of the oil pipe, preferably using an intervening primer layer to establish the rigorous bond needed (between interior surface of the pipe and the primer layer and between the primer layer and preformed film). Typically the as-manufactured and supplied oil pipe will have a coating of preservative (rust inhibitor) on the interior, relatively smooth surface to resistance rust. Preferably the removal step includes both cleaning the pipe interior surface and then roughening it, for instance by grit blasting, thereby ridding such surface of contaminants that could interfere with adhesion and providing a more adherent surface for the primer layer if used and for the preformed film. Conventional soaps and cleansers can be used. The pipe can be further cleaned by baking at high temperatures in air, temperatures of 800° F. (427° C.) or greater. The cleaned interior surface is then preferably grit blasted, with abrasive particles, such as sand or aluminum oxide, or can be roughened, such as by chemical etching, to form a roughened surface to improve the adhesion of the primer layer. The grit blasting is sufficient to remove any rust that may be present, thereby supplementing the cleaning of the interior surface. The roughening that is desired for primer layer adhesion can be characterized as a roughness average of 1-75 micrometers.

The forming step will include the consolidation of the primer layer from the dried liquid state or powder state to a solid film and the fusion bonding of the preformed film. This consolidation will generally involve baking of both of the layers, either sequentially of simultaneously. In this regard, the term "baking" is used in its broadest sense of achieving the aforesaid consolidation. Sometimes, the term "curing" is used to describe the film-forming effect; "curing" is included within the meaning of the term "baking". Typically, the baking is carried out by simply heating the layer(s) sufficiently above the perfluoropolymer melting temperature to cause the primer to flow and fuse with the preformed film. The primer layer may only need to be partly consolidated, such as by drying if applied as a liquid-based composition and possibly partially fused, with complete consolidation occurring upon fusion bonding with the preformed film.

In a preferred embodiment, the primer is applied to the cleaned, grit-blasted interior surface of the pipe by spraying a liquid-based composition from a nozzle at the end of a tube extending into the interior of the pipe and along its longitudinal axis. The primer is preferably applied to a heated pipe in order to prevent running, dripping and sagging. Typically the pipe is preheated to 110-125° F. (43-52° C.) but higher temperatures may be used providing that they are about 20° F. below the boiling point of the solvent of the composition. The spraying starts at the far end of the pipe and is moved backward along its longitudinal axis as the spray applies the liquid-based coating, until the entire interior surface is coated. The tube having the spray nozzle at its end is supported along its length and positioned axially within the pipe by sled elements positioned along the length of the tube. As the tube and its nozzle is retracted from the pipe, the sled elements slide along the interior surface of the pipe, leaving the underlying interior surface open to receive the sprayed coating.

The heating of the primer coating is sufficient to dry the coating to form the primer layer and may even be sufficient to bake the primer layer, prior to application of the preformed film. By melting temperature is meant the peak absorbance obtained in DSC analysis of the fluoropolymer. The barrier layer if used is applied in the same way as the primer layer and may be heated with the primer layer or applied to a dry primer layer and then heated to drying or baking prior to application of the preformed fluoropolymer film.

By "fusion bonding" is meant that the pipe is heated sufficiently to melt bond the preformed film to the primer layer or intervening barrier layer. That is to say, that the primer/film interface, or the interfaces of the primer layer/barrier layer/preformed film as the case may be, are melted together sufficiently to adhere the film firmly to the layer(s). Fusion bonding temperatures are dependent on the particular fluoropolymer present in the preformed film. For PFA or FEP, the pipe is heated (baked) by conventional means to a temperature between 500 to 700° F. (260 to 371° C.). For ETFE, the pipe is heated by conventional means to a temperature between 550° to 630° F. (288 to 332° C.). Time for fusion bonding will be dependent on the baking temperature used but is typically from 5 minutes to 60 minutes. Baking time and temperature must be sufficient to achieve a firm melt bond between the preformed film and the primer or barrier layer. As the pipe cools, there is a tendency for the preformed film to shrink. Unexpectedly, the intercoat bonding between the primer layer (and barrier layer, if present) and the preformed film is sufficient to prevent the film from pulling away from the primer layer or barrier layer.

The preformed film is sufficiently thick and defect free so as to minimize the passage of corrosive material to the interior surface of the pipe. The presence of fluoropolymer in the preformed film provides both excellent impermeability and nonstick character. The presence of fluoropolymer in the primer layer enables the preformed film to fusion bond to the primer layer in the carrying out of the baking step.

The preformed film is preferably in the shape of tubular liner with the outer diameter of the tube being greater than the interior diameter of the pipe to be lined. In a preferred embodiment the initial outer diameter of said tubular liner is about 10 to 15% greater than the inner diameter of the pipe. In a more preferred embodiment, the tubular liner is applied to the interior surface of the pipe according to the teachings of U.S. Pat. No. 3,462,825 (Pope et al.) by gripping one end of the liner, pulling the liner into the oil pipe mechanically reducing the outer diameter, releasing the liner and allowing the liner to expand into tight engagement with the primer layer (or barrier layer, if present) of the interior surface of the pipe. A preferred method for reducing the outer diameter is to pull the liner into the oil pipe through a reduction die as taught in Pope et al. Alternative means of reducing the diameter of the tubular liner such that it could be pulled into the oil pipe of smaller inner diameter include 1) pulling the tubular liner under tension such that the length of the liner increases and the diameter of the liner decreases as described in U.S. Pat. No. 5,454,419 to Vloedman or 2) pulling the tubular liner through diameter reducing rollers similar to those described in Canadian Patent 1241262 (Whyman et al). In either case, once the tubular liner is inserted in the oil pipe, it is released allowing the liner to expand into tight engagement with the primer layer (or barrier layer, if present) of the interior surface of the pipe.

Depending upon the specifics of the liner (wall thickness, % reduction, and exact material composition) a heat cycle may be required to relax/re-expand the liner tightly against the pipe walls. Following re-expansion of the liner, the pipe is baked to insure fusion bonding of the liner to the primer layer which adheres to the interior surface of the pipe. The baking of the primer layer (and barrier layer if present) and the fusion bonding of this layer to the preformed film is carried out by placing the pipe in an oven and heating the entire pipe sufficiently to cause baking and or fusion bonding to occur.

An alternate method of producing a lined pipe is called swaging. In this embodiment, the preformed film is preferably in the shape of tubular liner with the outer diameter of the tube being less than the interior diameter of the pipe to be lined. In a preferred embodiment, the initial outer diameter of said tubular liner is about 10 to 15% less than the inner diameter of the pipe. Swaging involves mechanically reducing the diameter of a steel pipe around a liner by use of a swaging device such as an Abby Etna Rotary Swager which applies an abundant amount of force to the pipe through hammering, for example applying 2400 blows per minute to cause the pipe to fit around the liner. As in the previously described process, the pipe is primed prior to having the liner inserted in it. After the liner is inserted and the pipe is "swaged" down around the liner, the pipe is placed in an oven and heated sufficiently to cause fusion bonding to occur.

Although Pope et al. have previously described manufacturing a pipe with a fluoropolymer liner, there are deficiencies in those teaching when trying to apply them to pipes of this invention. Pressure and temperature cycling that may occur in the use of such lined pipe may cause the lining to buckle pulling away from the interior surface allowing accumulation of gases and liquids between the liner and the wall surface and narrowing the path of oil flow. With the present invention, such buckling is prevented because of the presence of a primer layer on the pipe's interior surface bonding the film to the interior surface. It is unexpected that the fluoropolymer film adheres to the primer coating. The bonding of the film to the primer layer involves the heating of the pipe sufficiently to melt the primer/film interface and then cooling the pipe. The film has a greater shrinkage during cooling than the pipe, which would tend to pull the film away from the primer layer. Nevertheless, the bond achieved in the molten condition remains intact, resulting in the film forming a lining that is bonded to the pipe through the intervening primer (or barrier)

layer. The expansion of the film during the heating step, while theoretically greater than the expansion of the pipe, is limited by the relaxation effect of the heating of the film to the molten or near molten condition. The shrinkage of the film during cooling starts from this relaxed condition and then outpaces the shrinkage of the pipe. Under this condition, it is surprising that the molten bond retains its integrity during cooling. In a the present invention, the expansion fit of the Pope et al. approach for lining a pipe is replaced by a fusion bonded liner that resists separation and buckling characteristic of unbonded liners.

EXAMPLES

Sample preparation for each type of testing is provided later in the Examples.

The primer layers formed in the Examples have the following pre-bake compositions:

TABLE 1

Liquid Primers

| Ingredient | Primer 1 wt % | Primer 2 wt % |
|---|---|---|
| Fluoropolymer | | |
| FEP | 12.5 | |
| ETFE | | 20.7 |
| Polymer binder | | |
| Polyamideimide | 1.1 | 3.7 |
| Polyethersulfone | 7.6 | |
| Polyphenylene Sulfide | | 3.4 |
| Solvents | | |
| NMP* | 47.8 | 1.9 |
| Other Organics** | 20.1 | 4.7 |
| Water | | 60.2 |
| Pigments | 9.9 | 4.2 |
| Dispersing Agent | 1.0 | 1.2 |
| Total | 100 | 100 |

*NMP is N-methyl-2-pyrrolidone
**Other organics may include solvents such as MIBK (methyl isobutyl ketone), hydrocarbons such as heavy naphtha, xylene etc., furfuryl alcohol, triethanol amine or mixtures thereof.
FEP: TFE/HFP fluoropolymer containing 11.1-12.4 wt % HFP, an average particle size of 8 micrometers and a melt flow rate of 6.5-7.5 g/10 min measured at 372° C. by the method of ASTM D-1238.
ETFE: E/TFE/PFBE fluoropolymer containing 14-16 wt % ethylene and 4.0-5.4 wt % PFBE having average particle size of 8 micrometers and a melt flow rate of 3.9-7.1 g/10 min measured at 298° C. by the method of ASTM D-1238.

The barrier layer formed in the Examples has the following pre-bake composition:

TABLE 2

Barrier Layer

| Ingredient | Barrier Layer A wt % |
|---|---|
| PFA | 41.2 |
| Acrylic Thickener | 1.1 |
| Solvents | |
| Water | 42.8 |
| Glycerin | 8.3 |
| Other Organics** | 1.1 |
| Pigments | |
| Mica*** | 3.9 |

TABLE 2-continued

Barrier Layer

| Ingredient | Barrier Layer A wt % |
|---|---|
| Tin Metal | 1.2 |
| Surfactants | 0.4 |
| Total | 100 |

***Mica is red colored
PFA: TFE/PPVE fluoropolymer resin containing 3.2-4.1 wt % PPVE having a melt flow rate of 1.7-2.1 g/10 min and an average particle size of 35 micrometers.

The polymer top film layer formed in the following examples has the following compositions:

TABLE 3

Polymer Top Film Layer

| Composition | A* Fluorinated PFA | B PFA | C PFA | D FEP | E ETFE | F Epoxy |
|---|---|---|---|---|---|---|
| Wt % TFE | 93.0 | 93.0 | 95.8 | 88.2 | 75.8 | |
| Wt % PPVE | | | 4.2 | | | |
| Wt % PEVE | 7.0 | 7.0 | | | | |
| Wt % HFP | | | | 11.8 | | |
| Wt % Ethylene | | | | | 20.6 | |
| Wt % PFBE | | | | | 3.6 | |
| Wt % Epoxy | | | | | | 100 |
| MFR | 18.5 | 13.8 | 14.4 | 7.3 | 6.7 | |

*PFA Fluorinated: TFE/PEVE fluoropolymer resin fluorinated according to the teachings of U.S. Pat. No. 4,743,658 (Imbalzano et al./DuPont).

Peel/Adhesion Testing

In Examples 1-9 and Comparative Examples A-E, the substrates for coating and measuring peel strength are aluminum sheets, approximately 8 inches×8 inches (20.3×20.3 centimeters) and 200 microinches (5.1 micrometers) thick. The sheets are cleaned by baking 30 min @ 800° F. (427° C.) and are grit blasted with 40 grit aluminum oxide to a roughness of approximately 70-125 microinches (1.8-3.2 micrometers) Ra. Liquid coatings are applied by using a spray gun, Model Number MSA-510 available from DeVilbiss located in Glendale Heights, Ill. The polymer top film layer is applied via compression molding using a hydraulic bench press, Model P-21 available from Pasadena Hydraulic Inc. located in El Monte, Calif. Compression molding involves a sequence of steps where the material is subjected to series of increasing pressures at a set temperature. Compression molding conditions vary with composition of the polymer top film. The film layer may be preformed or, for purposes of some of these examples, may be formed directly on the sample from material in cube form (cubes are on the order of 1000×4000 micrometers in size). Similar results are obtained using either method of film forming. The direct application of cubes on the sample with subsequent compression molding simulates the application of a preformed film which is the preferred embodiment for this invention, especially when applying film to the inside of shaped articles such as pipes. Whether preformed or applied as cubes, the polymer top film is compression molded onto the sample piece using a 6 inch×6 inch (15.2×15.2 centimeters) chase. Approximately 56 grams of material is used for each sample, yielding a film approximately 1000 microns thick. In order to form tabs to be used for peel strength testing (per ASTM D 1876), a piece of Kapton® film is placed on one edge of the sample prior to compression molding thereby preventing the material used in the top film from contacting the sample in the area where the piece of Kapton® film is placed during the molding process. Compression molding conditions are shown in Table 4. Following the hot molding, the sample is immediately removed from the hot press and placed in a "cold" press (same model as above but with no temperature control) for cooling according to the conditions listed in Table 4.

TABLE 4

Compression Molding Conditions

|  | PFA and FEP | ETFE |
|---|---|---|
| Hot Press |  |  |
| Temperature 1 | 350° C. | 300° C. |
| Pressure 1 | None | None |
| Time 1 | 6 minutes | 6 minutes |
| Temperature 2 | 350° C. | 300° C. |
| Pressure 2 | ~55 psi | ~55 psi |
| Time 2 | 3 minutes | 3 minutes |
| Temperature 3 | 350° C. | 300° C. |
| Pressure 3 | ~555 psi | ~555 psi |
| Time 3 | 6 minutes | 6 minutes |
| Cold Press |  |  |
| Temperature | Room Temperature | Room Temperature |
| Pressure | ~555 psi | ~555 psi |
| Time | 5 minutes | 5 minutes |

Upon cooling, 5 strips (each 1 inch×6 inch, 2.5×15.2 centimeters) are cut from each sample. Individual strips are placed in an oven for additional baking as described in the Examples to insure that the preformed film is fusion bonded. The atmosphere in the oven is ambient air. Adhesion strength peel testing is performed according to ASTM D 1876 on strips after fusion bonding as described in the Examples. Peel strength (lbf/in)—interface failure is recorded. The superior adhesion of the substrates with nonstick films in the Examples of this invention is evident when a comparison is made to substrates prepared in the Comparative Examples that do not use primer systems. That comparison is summarized in Table 5.

Comparative Example A

Aluminum sheet is grit blasted lightly. Polymer Film A is compression molded onto the sheet having no primer and no barrier layer. The thickness of Polymer Film A is about 1000 microns. The sample is cut into strips, baked at 350° C. for 5 minutes and tested using a 180° peel test according to ASTM D 1876. The adhesion strength is 11 lbf/in.

Example 1

Aluminum sheet is grit blasted lightly. Primer 1 is sprayed onto the sheet and dried for 10 min at 399° C. The primer layer is 5-10 microns thick. Polymer Film A is compression molded onto the primed sheet. The thickness of the Polymer Film A is about 1000 microns. The sample is cut into strips, baked at 350° C. for 5 minutes and tested using a 180° peel test according to ASTM D 1876. The adhesion strength is 14 lbf/in.

Example 2

Aluminum sheet is grit blasted lightly. Primer 1 is sprayed onto the sheet and dried for 10 min at 177° C. Barrier layer A is then sprayed onto the primed sheet and dried for 10 min at 399° C. The primer layer is 5-10 microns thick. The barrier layer is 30-60 microns thick. Polymer Film A is compression molded onto the foil. The thickness of the Polymer Film A is about 1000 microns. The sample is cut into strips, baked at 350° C. for 5 minutes and tested using a 180° peel test according to ASTM D 1876. The adhesion strength is 15 lbf/in.

Comparative Example B

Aluminum sheet is grit blasted lightly. Polymer Film B is compression molded onto the sheet having no primer and no barrier layer. The thickness of the Polymer Film B is about 1000 microns. The sample is cut into strips, baked at 350° C. for 5 minutes and tested using a 180° peel test according to ASTM D 1876. The adhesion strength is 11 lbf/in.

Example 3

Aluminum sheet is grit blasted lightly. Primer 1 is sprayed onto the sheet and dried for 10 min at 399° C. The primer layer is 5-10 microns thick. Polymer Film B is compression molded onto the primed foil. The thickness of the Polymer Film B is about 1000 microns. The sample is cut into strips, baked at 350° C. for 5 minutes and tested using a 180° peel test according to ASTM D 1876. The adhesion strength is 13 lbf/in.

Example 4

Aluminum sheet is grit blasted lightly. Primer 1 is sprayed onto the foil and dried for 10 min at 177° C. Barrier layer A is then sprayed onto the primed sheet and dried for 10 min at 399° C. The primer layer is 5-10 microns thick. The barrier layer is 30-60 microns thick. Polymer Film B is compression molded onto the foil. The thickness of the Polymer Film B is about 1000 microns. The sample is cut into strips, baked at 350° C. for 5 minutes and tested using a 180° peel test according to ASTM D 1876. The adhesion strength is 17 lbf/in.

Comparative Example C

Aluminum sheet is grit blasted lightly. Polymer Film C is compression molded onto the sheet having no primer and no barrier layer. The thickness of the Polymer Film C is about 1000 microns. The sample is cut into strips, baked at 350° C. for 5 minutes and tested using a 180° peel test according to ASTM D 1876. The adhesion strength is 11 lbf/in.

Example 5

Aluminum sheet is grit blasted lightly. Primer 1 is sprayed onto the sheet and dried for 10 min at 399° C. The primer layer is 5-10 microns thick. Polymer Film C is compression molded onto the primed foil. The thickness of the Polymer Film C is about 1000 microns. The sample is cut into strips, baked at 350° C. for 5 minutes and tested using a 180° peel test according to ASTM D 1876. The adhesion strength is 14 lbf/in.

Example 6

Aluminum sheet is grit blasted lightly. Primer 1 is sprayed onto the foil and dried for 10 min at 177° C. Barrier layer A is then sprayed onto the primed foil and dried for 10 min at 399° C. The primer layer is 5-10 microns thick. The barrier layer is 30-60 microns thick. Polymer Film C is compression molded onto the foil. The thickness of the Polymer Film C is about 1000 microns. The sample is cut into strips, baked at 350° C.

for 5 minutes and tested using a 180° peel test according to ASTM D 1876. The adhesion strength is 14 lbf/in.

Comparative Example D

Aluminum sheet is grit blasted lightly. Polymer Film D is compression molded onto the sheet having no primer and no barrier layer. The thickness of the Polymer Film D is about 1000 microns. The sample is cut into strips, baked at 350° C. for 5 minutes and tested using a 180° peel test according to ASTM D 1876 The adhesion strength is 9.0 lbf/in.

Example 7

Aluminum sheet is grit blasted lightly. Primer 1 is sprayed onto the sheet and dried for 10 min at 399° C. The primer layer is 5-10 microns thick. Polymer Film D is compression molded onto the primed sheet. The thickness of the Polymer Film D is about 1000 microns. The sample is cut into strips baked at 350° C. for 5 minutes and tested using a 180° peel test according to ASTM D 1876. The adhesion strength is 12 lbf/in.

Example 8

Aluminum sheet is grit blasted lightly. Primer 1 is sprayed onto the sheet and dried for 10 min at 177° C. Barrier layer A is then sprayed onto the primed sheet and dried for 10 min at 399° C. The primer layer is 5-10 microns thick. The barrier layer is 30-60 microns thick. Polymer Film D is compression molded onto the sheet. The thickness of the Polymer Film D is about 1000 microns. The sample is cut into strips, baked at 350° C. for 5 minutes and tested using a 180° peel test according to ASTM D 1876. The adhesion strength is 13 lbf/in.

Comparative Example E

Aluminum sheet is grit blasted lightly. Polymer Film E is compression molded onto the sheet having no primer and no barrier layer. The thickness of the Polymer Film E is about 1000 microns. The sample is cut into strips, baked at 300° C. for 5 minutes and tested using a 180° peel test according to ASTM D 1876. The adhesion strength is 9 lbf/in.

Example 9

Aluminum sheet is grit blasted lightly. Primer 2 is sprayed onto the sheet and dried for 10 min at 316° C. The primer layer is 5-10 microns thick. Polymer Film E is compression molded onto the sheet. The thickness of the Polymer Film E is about 1000 microns. The sample is cut into strips, baked at 300° C. for 5 minutes and tested using a 180° peel test according to ASTM D 1876. The adhesion strength is 11 lbf/in.

TABLE 5

Peel/Adhesion Strength

| Examples | Coating on Foil | Peel Strength (lbf/in) After Fusion Bonding |
| --- | --- | --- |
| Comp A | Polymer A | 11 |
| 1 | Primer 1/Polymer A | 14 |
| 2 | Primer 1/Barrier A/Polymer A | 15 |
| Comp B | Polymer B | 11 |
| 3 | Primer 1/Polymer B | 13 |
| 4 | Primer 1/Barrier A/Polymer B | 17 |
| Comp C | Polymer C | 11 |
| 5 | Primer 1/Polymer C | 14 |
| 6 | Primer 1/Barrier A/Polymer C | 14 |
| Comp D | Polymer D | 9 |
| 7 | Primer 1/Polymer D | 12 |
| 8 | Primer 1/Barrier A/Polymer D | 13 |
| Comp E | Polymer E | 9 |
| 9 | Primer 2/Polymer E | 11 |

Cold Finger Paraffin Deposition Testing

A cold finger apparatus, available at Westport Technology Center International (Houston, Tex.) is used to test the baked coatings as prepared in the Examples for the degree of release (non-stick) they exhibit. The apparatus includes a circulating beaker (double-walled) filled with mineral oil and connected to a first temperature bath which is placed on a magnetic mixing plate. A stainless steel cup with a magnetic stirring bar is submerged in the mineral oil and the temperature set to 140° F. (60° C.). A cold finger (tubular projection) is connected to a second water circulating temperature bath, and the temperature set to 60° F.

Stainless steel sleeves (6" long, 0.5" inside ID, 0.625" OD) closed flat at the bottom which are coated as described in the Examples are washed with solvent (toluene, then methanol) and placed in a hot oven to ensure a clean surface for wax to deposit on. The sleeve is then weighed, secured over the finger with a set screw at the top to create a tight fit, and allowed to cool for thirty minutes. After thirty minutes, the sleeve is attached over the cold finger in a tight fit and submerged in the crude oil for twenty-four hours.

Crude oil known to have a large wax content with a wax appearance temperature of approximately 105° F. is used for this test. The crude is initially heated to 150° F. (66° C.) and centrifuged twice to remove any water and sediments. The source sample of crude is maintained at 150° F. (66° C.) during the duration of the testing to ensure the wax remained in solution.

At the completion of the twenty-four hour test time, the sleeve is removed from the crude and allowed to sit for one hour at 60° F. (16° C.) in a nitrogen environment. A final weight is measured. Weight data collected before and after submersion are used to calculate the wax deposition on the sleeve. From the material balance a mass per unit area is calculated for comparison purposes. The baseline for comparison is the paraffin adhesion test performed on commercially available epoxy-resin coated oil pipe, wherein the deposition of paraffin on the epoxy resin coating amounted to 0.0652 g/cm$^2$.

For determining the degree of paraffin deposition in Examples 10-11 and Comparative Examples F and G, the substrate being coated is a stainless steel sleeve suitable for use in the apparatus described above in the Cold Finger Paraffin Deposition Test. Samples are coated with primers as described in Table 1 and polymers of the composition of those described previously as Polymer Top Layers in Table 3. Liquid coatings are applied by using a spray gun, Model Number MSA-510 available from DeVilbiss located in Glendale Heights, Ill. Powder coatings are applied by using Nordson manual electrostatic powder spray guns, Model Versa—

Spray I located in Amhearst, Ohio. The baseline for comparison is the Cold Finger Paraffin Deposition Test performed on commercially available epoxy-resin coated oil pipe, wherein the deposition of paraffin on the epoxy resin coating amounted to $0.0652$ g/cm$^2$. The examples of this invention all have coatings with a wax deposition below that of standard epoxy resin coating.

Comparative Example F

Epoxy Standard

A layer of Polymer Top layer F (epoxy powder) is applied to a prepared stainless steel sleeve, followed by baking at 316 C for 20 minutes. The dry film thickness (DFT) of the paint layer is 100-125 micrometers. When the coated sleeve is subjected to the Cold Finger Paraffin Deposition Test, a deposition of $0.0652$ g/cm$^2$ is obtained.

Comparative Example G

Uncoated Substrate

An uncoated prepared stainless steel sleeve is subjected to the Cold Finger Paraffin Deposition Test, a deposition of $0.0296$ g/cm$^2$ is obtained.

Example 10

FEP Primer/Fluorinated PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of Polymer Top Layer A (fluorinated PFA powder) is applied over the dried primer layer. It is baked at 399° C. for 20 minutes. The total DFT is 60-75 micrometers. A second layer of Polymer Top Layer A is applied. It is baked at 371° C. for 20 minutes. The total DFT is 100-125 micrometers and the total thickness of the Top Layer is 81-113 micrometers. When the coated sleeve is subjected to the Cold Finger Paraffin Deposition Test, a deposition of only $0.0145$ g/cm$^2$ is obtained.

Example 11

FEP Primer/Fluorinated PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of Polymer Top Layer A (fluorinated PFA powder) is applied over the dried primer layer. It is baked at 399° C. for 20 minutes. The total DFT is 60-75 micrometers. A second layer of Polymer Top Layer A is applied. It is baked at 371° C. for 20 minutes. The total DFT is 100-125 micrometers and the total thickness of the overcoat is 81-113 micrometers. Additional layers of Top Layer A are applied until the Top Layer is 306-363 micrometers thick and each is baked at 371 C for 20 min. The total DFT of the coating system is 325-375 micrometers. When the coated sleeve is subjected to the Cold Finger Paraffin Deposition Test, a deposition of only $0.0042$ g/cm$^2$ is obtained showing the advantages of using a thicker top layer as compared to Example 10. A thick top layer may be readily supplied by using a preformed film.

Paraffin Flow Loop Deposition Testing

A flow loop apparatus available at Wax Technology Lab of ILT, ChevronTexaco Energy Technology Company (Houston, Tex.) is used to test the effect of a fluoropolymer film on paraffin deposition. The apparatus includes a 1" diameter wax deposition-rheology flow loop which is fully automated to measure wax deposition and rheology of fluid in the tubes.

The flow loop apparatus includes 2 tubes through which the oil flows. One, called a test tube unit, is designed to monitor wax deposition from the oil at various operation conditions. The other unit, called a reference tube, is used as a reference for measurement of oil rheology. The two tube units are identical and are 1.0-inch-OD and 0.875-inch ID steel tube which are 70" in length. Each unit is a tube-shell type heat exchanger and is connected to a coolant circulator. A differential pressure gauge is connected to both ends of each tube unit to measure pressure drop across each tube.

The oil for this testing is heated to a temperature higher than the cloud point. Then the oil is transferred to the flow loop by a pump at a pressure above the oil bubble point pressure. The total volume of oil placed in the system is recorded. The system pressure is maintained at a constant pressure above the oil bubble point pressure. At the beginning, the temperatures of the air bath and the chilling circulators for both the test tube and reference units are set at the same temperature greater than the oil cloud point temperature. For example, the temperature is set at 130° F. with a cloud point at 124° F. Then, oil is circulated through the entire closed loop.

When the oil density reaches constant, the system is considered in steady state. The test tube unit is then cooled to a desired temperature (expected ambient temperature around the pipe) as fast as possible. When the ambient temperature around the test tube reaches the expected value, then a cooling process is initiated by decreasing temperatures of the reference chiller and the air bath. However, the ambient temperature around the reference tube is maintained at temperatures higher than the oil temperature. This is to prevent wax deposition in the reference tube. The oil cooling rate is about 0.5° F. per minute. The cooling process simulates transporting oil through a subsea pipeline.

The data acquisition unit automatically acquires time, volumetric flow rate, fluid density system pressures, differential pressure across the test tube and the reference tube, and temperatures at various locations. The method for wax deposition measurement does not require disassembly of the test tube. It is determined by the changes in pressure across the "test" tube and so is done dynamically.

The oil used for this test has a wax appearance temperature (WAT) of 100° F. The cooling rate is 0.1° F./min. The oil temperature range is 140 to 75° F. Ambient temperature of test tube for all tests is 51° F. Deposition is monitored under turbulent flow conditions (oil flow velocity of 8 ft/sec).

Wax deposition may be significantly effected by the temperature gradient between temperatures at pipe center and inner pipe wall under wax deposition flow conditions. Insulation will decrease the temperature gradient (if the pipe center temperatures are the same) and then decrease wax deposition. In order to eliminate the insulation effect while studying the effect of our coatings/linings/films both internally and externally coated tubes are used for these tests.

In Comparative Examples I, J and Examples 12, 13 polymers are applied by flow coating. By this method, pipe is capped on one end with a cap that has a small valve in it. The pipe is positioned vertically and filled with liquid coating. The valve in the endcap is opened allowing most of the coating to flow out of the pipe. Residual coating remains on the pipe walls.

Comparative Example H

Bare Tube

An uncoated/unlined prepared stainless steel tube is subjected to the Paraffin Deposition Flow Loop Test. Identical tubes are used as the "test" and "reference tube". Wax deposition on the tube wall is recorded as a function of temperature and results are presented in Table 6.

Comparative Example I

Externally Coated—Thin

A 25 micrometer (1 mil) coating of PFA (composition of Polymer Top Layer B) is applied to the outside of two test tubes via flow coating The tubes are subjected to the Paraffin Deposition Flow Loop Test and Deposition Test with one as the "test" tube and one as the "reference" tube. Wax deposition on the tube wall is recorded as a function of temperature and results are presented in Table 6.

Comparative Example J

External Coating—Thick

A 1000 micrometer (40 mil) PFA liner (composition of Polymer Top Layer B) is applied to the outside of 2 test tubes via standard fluoropolymer processing techniques. The tubes are subjected to the Paraffin Deposition Flow Loop Test and Deposition Test with one as the "test" tube and one as the "reference" tube. Wax deposition on the tube wall is recorded as a function of temperature and results are presented in Table 6.

Example 12

Internally Coated—Thin

A 25 micrometer (1 mil) PFA coating (composition of Polymer Top Layer B) is applied to the inside of 2 test tubes via flow coating. The tubes are subjected to the Paraffin Deposition Flow Loop Test and Deposition Test with one as the "test" tube and one as the "reference" tube. Wax deposition on the tube wall is recorded as a function of temperature and results are presented in Table 6.

Example 13

Internally Coated—Thick

A 1000 micrometer (40 mil) preformed PFA (composition of Polymer Top Layer B) liner is applied to the inside of 2 test tubes. This liner is not adhered to the test tube walls but is instead friction fitted in the tube. The tubes are subjected to the Paraffin Deposition Flow Loop Test and Deposition Test with one as the "test" tube and one as the "reference" tube. Wax deposition on the tube wall is recorded as a function of temperature and results are presented in Table 6.

For each of the afore-listed examples, wax deposition thickness on the tube walls is recorded as the wall temperature is dropped. Results are presented in Table 6. Wax deposition on the tube wall is recorded as a function of temperature and results are presented in Table 6.

The thin-coated tubes are significantly better than the corresponding uncoated tube or external thin-coated tube. At temperatures below the wax appearance temperature of 100° F. (where the wax actually causes a problem in wells), the deposition is even less on the internal thick coated tube. This is a combined effect of the non-stick nature of the lining as well as its insulating ability.

TABLE 6

Paraffin Flow Loop Wax Deposition Thickness
(as a function of wall temperature)
Wax thickness presented in millimeters (mm)

| Wall Temperature | Bare | Externally Coated - Thin | Internally Coated - Thin | Externally Coated - Thick | Internally Coated - Thick |
|---|---|---|---|---|---|
| 80° F. | 0.4388 | 0.2016 | 0.1005 | — | — |
| 90° F. | 0.1545 | 0.1535 | 0.0788 | 0.0901 | 0.0032 |
| 100° F. | 0.0983 | 0.0953 | 0.0090 | 0.0743 | 0.0000 |
| 110° F. | 0.0703 | 0.0674 | 0.0000 | 0.0657 | 0.0000 |
| 120° F. | 0.0401 | 0.0409 | 0.0000 | 0.0484 | 0.0038 |
| 130° F. | 0.0184 | 0.0148 | 0.0000 | 0.0198 | 0.0236 |
| 140° F. | 0.0000 | 0.0000 | 0.0000 | 0.0000 | 0.0000 |

Example 14

In a similar experiment to the data summarized in Table 6 (same test equipment and same sample preparation) wax deposition is evaluated over a longer run time (50 hrs) at 90° F. In this experiment the temperature is ramped down from 140° F. to 90° F. in 100 minutes, then held there. Deposition is again evaluated under turbulent flow conditions. The data is summarized in Table 7. There is significant build up of wax on the external thin coated tubes. The thin internal coating and the thick external coating show significantly reduced wax deposition and the thick internal coating shows almost no deposition.

TABLE 7

Paraffin Flow Loop Wax Deposition rate
under turbulent flow conditions

| Tube | Wax Thickness at 2000 min, (mm) | Wax Deposition Rate, (mm/hr) |
|---|---|---|
| Externally thin-coated tube | 0.45 | 0.0135 |
| Internally thin-coated tube | 0.16 | 0.0048 |
| Externally thick-coated tube | 0.13 | 0.0039 |
| Internally thick-coated tube | ~0 | ~0 |

Inorganic Scale Deposition Testing

Example 15

Polymer Top Film Layers (FEP and PFA) from the foregoing Examples are subjected to coupon immersion testing in brine solutions in order to determine the reduction in inorganic scale deposition of the coated coupon, with the result being that scale deposition is reduced by more than 50 wt % as compared to the uncoated coupons. These tests are done by soaking coated and uncoated steel coupons in calcite and barite brine solutions having the following compositions:

| Brine A | g/kg water | Brine B | g/kg |
|---|---|---|---|
| $CaCl_2 \cdot 2H_2O$ | 36.87 | same | 8.6 |
| KCl | 11.43 | same | 4.38 |
| $MgCl_2 \cdot 6H_2O$ | 1.8 | same | 0.41 |
| NaCl | 138.9 | same | 89.09 |
| $Na_2SO_4$ | 0.32 | — | |
| | | $BaCl_2$ | 3.08 |

The coupons are suspended for two days under 100 psi (6.9 MPa) pressure in either in Brine A heated at 140 F (60° C.) or in Brine B heated at 90° F. (32° C.) and the weight pickups (scale deposition) for the coated coupons are compared to that for the uncoated steel coupons to reveal the reduction in scale deposition for the coupons coated with linings of the present invention.

Asphaltene Deposition Testing

Example 16

Asphaltene is a mixture of amorphous high molecular weight, polynuclear aromatic compounds, containing C, H, O, N, and S, and often metals such as V or Ni. Asphaltene is soluble in oil, but becomes insoluble with drop in pressure, change in pH, or solvency change such as occurs in oil pipe utility. Asphaltene deposition can be measured by the flow loop method as practiced by the Petroleum Research Center located at the New Mexico Institute of Mining and technology in Socorro, N. Mex. Briefly, the material to be tested is formed into a loop and oil is flowed through the loop under conditions to cause the asphaltene in the oil to become insoluble, so that it has a chance to deposit on the interior surface of the loop. The deposition of asphaltene is determined by weighing the loop after the flow experiment is completed, comparing such weight with the weight of the loop before the flow test. In greater detail, the loop being tested is a tube that 100 ft (30.5 m) long and has an interior diameter of 0.03 in (0.75 mm) and is made of either polymer or steel. The tube is formed into a coil (loop), like a spring, so that it will fit into a water bath maintained at 60° C. A 50/50 vol % mixture of asphaltene-containing oil and n-pentadecane solvent is metered through the loop at a rate of 0.24 ml/hr for 24 hrs. The oil tested had the following characteristics: API gravity of 28.8°, viscosity of 30 cP at 20° C., and is composed of 51.1% saturates, 28.3% aromatics, 14.5% resins, 6.1% asphaltenes and contained 19 ppm Ni and 187 ppm V. For the uncoated steel loop, the weight gain from deposited asphaltene is 0.51 g, while for FEP (TFE 88.2 wt %/HFP 11.8 wt %) and the fluorinated PFA (TFE 95.8 wt %/PPVE 4.2 wt % fluorinated according to the teachings of U.S. Pat. No. 4,743,658 Imbalzano et al) there is no weight gain, indicating the effectiveness of the perfluoropolymer to reduce asphaltene deposition.

Salt Water Permeation Testing

Example 17

This test is conducted to determine the salt water permeability of perfluoropolymers as compared to epoxy resin by exposing 5 mil (127 micrometers) thick coatings of these materials on steel coupons to salt water under severe conditions and subjecting the so-exposed coupons to the well-known Log Z-Electrical Impedance Spectroscopy. Impedance of the coating before and after the exposure is compared. A reduction in impedance indicates the permeability of the coating. In greater detail, the coated coupons are suspended in an autoclave having a 5 wt % NaCl aqueous solution therein in contact with a portion of the coating. The autoclave is maintained at 251° F. (122° C.) and 1026 psi (70.8 MPa) for 29 days. The impedance of the coating is measured (before and after salt water exposure) using an electrochemical cell consisting of the coated coupon, a reference electrode, and an inert counter electrode. The electronic measuring equipment consists of a potentiostat, a frequency response analyzer and a computer with electrical impedance spectroscopy software. Impedance of the coating is measured as a function of the frequency of the applied AC voltage. The frequency ranges from 0.001 to 100 kHz. The resulting data is presented in the form of a Bode plot, consisting of LogZ plotted versus Log f, where Z is the impedance in ohms cm and f is frequency in Hertz. The comparison in impedance results is taken a 0.1 of the Bode plot, as follows:

| | Log Z impedance | |
|---|---|---|
| Coating | Before Exposure | After Exposure |
| PFA | 11.0 | 10.9 |
| FEP | 11.0 | 11.0 |
| Epoxy | 10.8 | 7.1 |

The 34% decrease in impedance for the epoxy resin coating represents a substantial permeability of this coating to the salt water, and indeed the coating blisters in places from the underlying steel coupon. In contrast, the impedance of the perfluoropolymer coatings is substantially unchanged and there is no separation (no blistering) of the coating from the steel coupon, indicating substantial impermeability of these coatings to the salt water. This substantial impermeability can therefore be characterized by the absence of coating separation of the coating from the steel coupon or quantitatively by the reduction in Log Z impedance of less than 10%, preferably less than 5%. When the coated coupons are subjected to $H_2S$ gas and methane/toluene liquid mixture in the same autoclave under the same conditions as the salt water testing, no change in the coatings is noticed, indicating the greater severity of the salt water exposure.

Additionally when the coupon is coated with a barrier layer together with a polymer top layer, it is visually apparent that there is less blistering produced as a result of permeation indicating superior corrosion resistance.

What is claimed is:

1. Process for forming a nonstick surface on the interior surface of a pipe, said pipe having an inner diameter, comprising (a) applying primer coating to said surface (b) heating said coating to form a primer layer on said surface (c) providing a preformed fluoropolymer film in the shape of a tubular liner having an outer diameter greater than the inner diameter of said pipe, (d) reducing said outer diameter of said preformed fluoropolymer film by pulling said preformed fluoropolymer film through a reduction die, (e) inserting said preformed fluoropolymer film into said pipe and into contact with said primer layer, and (f) fusion bonding said preformed fluoropolymer film to said primer layer.

2. The process of claim 1 wherein said primer comprises a fluoropolymer.

3. The process of claim 1 wherein said pipe is an oil conveying pipe.

4. The process of claim 1 wherein a barrier layer is applied to said primer layer prior to applying said preformed film and then fusion bonding said preformed film to said barrier layer by baking said pipe.

5. The process of claim 1 wherein said pipe is baked at temperatures from about 180° C. to about 400° C. to achieve fusion bonding.

\* \* \* \* \*